United States Patent [19]

Crane et al.

[11] 4,008,502
[45] Feb. 22, 1977

[54] MEAT GRIPPING AND MOVING CYLINDER AND MOUNT THEREFOR

[75] Inventors: Herbert R. Crane, Tipp City; Anthony L. Fullenkamp, Ft. Loramie, both of Ohio

[73] Assignee: Hobart Corporation, Troy, Ohio

[22] Filed: May 6, 1976

[21] Appl. No.: 683,913

Related U.S. Application Data

[63] Continuation of Ser. No. 535,041, Dec. 20, 1974, abandoned.

[52] U.S. Cl. ............................. 15/3.17; 29/125; 17/26; 198/624
[51] Int. Cl.² ........................................ A22C 17/08
[58] Field of Search ................. 198/210, 211, 229; 15/3.15, 3.16, 3.17, 77; 17/18, 26; 29/115, 124, 125, 129, 130

[56] References Cited

UNITED STATES PATENTS

| | | | |
|---|---|---|---|
| 1,600,002 | 9/1926 | Kingery | 17/26 |
| 2,547,234 | 4/1951 | Spang | 17/26 |
| 2,561,867 | 7/1951 | Jackson | 17/26 |
| 2,598,548 | 5/1952 | Jackson | 17/26 |
| 2,605,497 | 8/1952 | Spang | 17/26 |
| 2,886,845 | 5/1959 | Byland et al. | 17/26 |
| 3,102,290 | 9/1963 | Sannes | 15/77 X |
| 3,389,414 | 6/1968 | Russell | 15/3.17 |
| 3,606,628 | 9/1971 | Russell | 15/3.17 |
| 3,781,936 | 1/1974 | Russell | 15/77 X |
| 3,857,131 | 12/1974 | Russell | 15/3.17 |

*Primary Examiner*—Evon C. Blunk
*Assistant Examiner*—Richard K. Thomson

[57] ABSTRACT

Each of the meat gripping and moving cylinders in a meat scraping machine may be removed from the machine as a complete subassembly and disassembled quickly and easily for cleaning, without the need for tools. Each cylinder includes a carrier framework mounting removable ring supports which maintain a plurality of separate, toothed, blade-like meat gripping and driving rings in spaced, concentric position on the framework. During assembly, the rings are placed on the framework before the last support is inserted. The last support is then inserted and locked in position, which locks the rings into position on the framework.

6 Claims, 24 Drawing Figures

MEAT GRIPPING AND MOVING CYLINDER AND MOUNT THEREFOR

This is a continuation of application Ser. No. 535,041, filed Dec. 20, 1974, now abandoned.

CROSS REFERENCE TO RELATED APPLICATIONS

Reference is made to copending U.S. applications Ser. No. 566,366, filed Apr. 9, 1975, and Ser. No. 535,037, filed Dec. 20, 1974, now U.S. Pat. No. 3,954,618, both assigned to the assignee of the present invention.

BACKGROUND OF THE INVENTION

This invention relates to meat scraping machines for cleaning the freshly sawed or cut surfaces of a piece of meat, and more particularly to a meat gripping and moving cylinder, and an integral mount for such a cylinder, for gripping and driving a freshly sawed piece of meat through such a machine.

The faces of sawed meat have customarily been cleaned for reasons of sanitation and appearance. The cutting process is commonly done with a band saw, and this usually leaves residues of coagulated blood, bond dust, marrow, meat particles, fat, and so on, on the freshly sawed meat surfaces. These residues are unappealing to purchasers as they view the meat, so retailers commonly wash and clean the freshly sawed meat before it is put on display.

In view of the time and labor involved in manually scraping each piece of meat with a hand tool, it has long been desirable to automate the cleaning process. Until recently, however, most efforts in this direction have been unsuccessful. Foremost among the causes have been the problems of accommodating meats of all sizes and thicknesses, and of meeting the very strict sanitation requirements of the U.S. Department of Agriculture (U.S.D.A.) and the National Sanitation Foundation (N.S.F.), as well as various state and local regulatory agencies. A successful machine must therefore be highly versatile, thorough, and quick, and it must also be completely sanitary in operation and quickly and easily cleanable after use.

Meat scraping machines such as disclosed in U.S. Pat. Nos. 3,389,414, 3,439,369, 3,478,380, 3,606,628, and 3,781,936 represent significant improvements in automating the cleaning of cut meats and reducing the manual labor and time heretofore necessary. U.S. Pat. No. 3,781,936, in particular, discloses a meat scraping machine which has solved a number of the prior art problems. It scrapes both cut faces of the meat automatically and quickly, and accepts the commonly encountered thicknesses. Most of the manual labor has been eliminated, and the machine produces a product which is highly appealing to the consumer.

SUMMARY OF THE INVENTION

The present invention is directed to improvements in meat scraping machines such as those mentioned above, and in particular to highly sanitary meat gripping and moving cylinders for such a machine. The meat gripping and moving cylinders drive and carry the meat through the machine as it is cleaned. Each cylinder is defined by a series of spaced, coaxial blade-like driving rings, which, together with their mount, form an integral subassembly which may be inserted into the meat scraping machine and removed therefrom as a single unit.

The cylinder and mount assembly, when removed from the machine, may be quickly disassembled without the use of tools, easily and thoroughly cleaned, and then quickly and easily reassembled for replacement into the meat scraping machine. When disassembled, the individual parts of the cylinder and mount assembly show no cracks, crevices, screw threads, etc., which would be difficult to clean and could retain bacteria breeding material. Cleaning and maintenance of the cylinder and cylinder mount is completely sanitary condition is thus simple and convenient, and the present invention meets the very strict sanitation standards of the U.S.D.A. and N.S.F.

In particular, each cylinder and mount includes a free-standing or self-supporting carrier framework which extends the entire length of the cylinder. The individual open, annular, blade-like rings which define the cylinder are supported on three or more separate ring supports which in turn are carried on the carrier framework. Each ring support is formed of plastic material and is reinforced by a wire truss. The plastic ring supports and trusses are easily snapped apart and back together, and two of them enjoy a snap fit onto the carrier framework. The third ring support and truss are retained in position on the framework by sliding the ends of the truss into receiving slots in the framework ends.

Thus, to assemble the cylinder, the first two ring supports and trusses are snapped together and placed in position on the framework. The framework is placed in its self-supporting, free-standing position (with one of the supports near the top of the framework) and the individual rings are hung in position on the support to define the cylinder. The third support is then inserted through the core of the cylinder, moved into contact with the rings, and slid along the rings until engaged within the slots in the framework. At this point the three supports engage the rings at three separate spaced regions on the inner surfaces of the rings, holding the rings concentrically in position on the framework. The rings are slidably supported on the ring supports so that they may rotate with respect to the framework, and they have toothed outer circumferences for affirmatively engaging and gripping the meat to be cleaned.

A spline gear is mounted adjacent the third ring support in engagement with the ring teeth to drive the rings simultaneously about the carrier framework. The spline gear bearings in the framework are individually removable from the framework and include manually operable ear and hook means for locking the bearings and spline gear into the framework. The same ear and hook means also lock the third support and truss member in the framework slots, thus completing assembly of the cylinder on the cylinder mount.

Other features include an axially eccentric and reversible mount for the spline gear drive to distribute wear along the length of the spline gear for increased service life, crevice-free spacer projections staggered along the plastic ring supports for maintaining the rings in spaced-apart relation on the framework, and fingers on the third support truss projecting between the rings and overlying the spline gear drive to guide meat away from the rings before it meets the spline gear.

It is therefore an object of this invention to provide a highly sanitary and easily cleanable meat gripping and moving cylinder for use in a meat scraping machine; a cylinder and mount providing for ready and quick disassembly, cleaning and reassembly; which may be disassembled and reassembled without the use of tools; which is substantially free of exposed crevices, cracks, threads, and so on, for improved sanitation and ease of cleaning; which is uncomplicated in design and uses uncomplicated assembly and disassembly procedures; which provides exceptional durability, strength, and long life, and is particularly well adapted for commercial applications; and which is easily inserted into, engaged with, and removed from a meat scraping machine as an integral unit.

Other objects and advantages of the invention will be apparent from the following description, the accompanying drawings, and the appended claims.

DESCRIPTION OF THE PREFERRED EMBODIMENT

Figures 1, 2, 3:
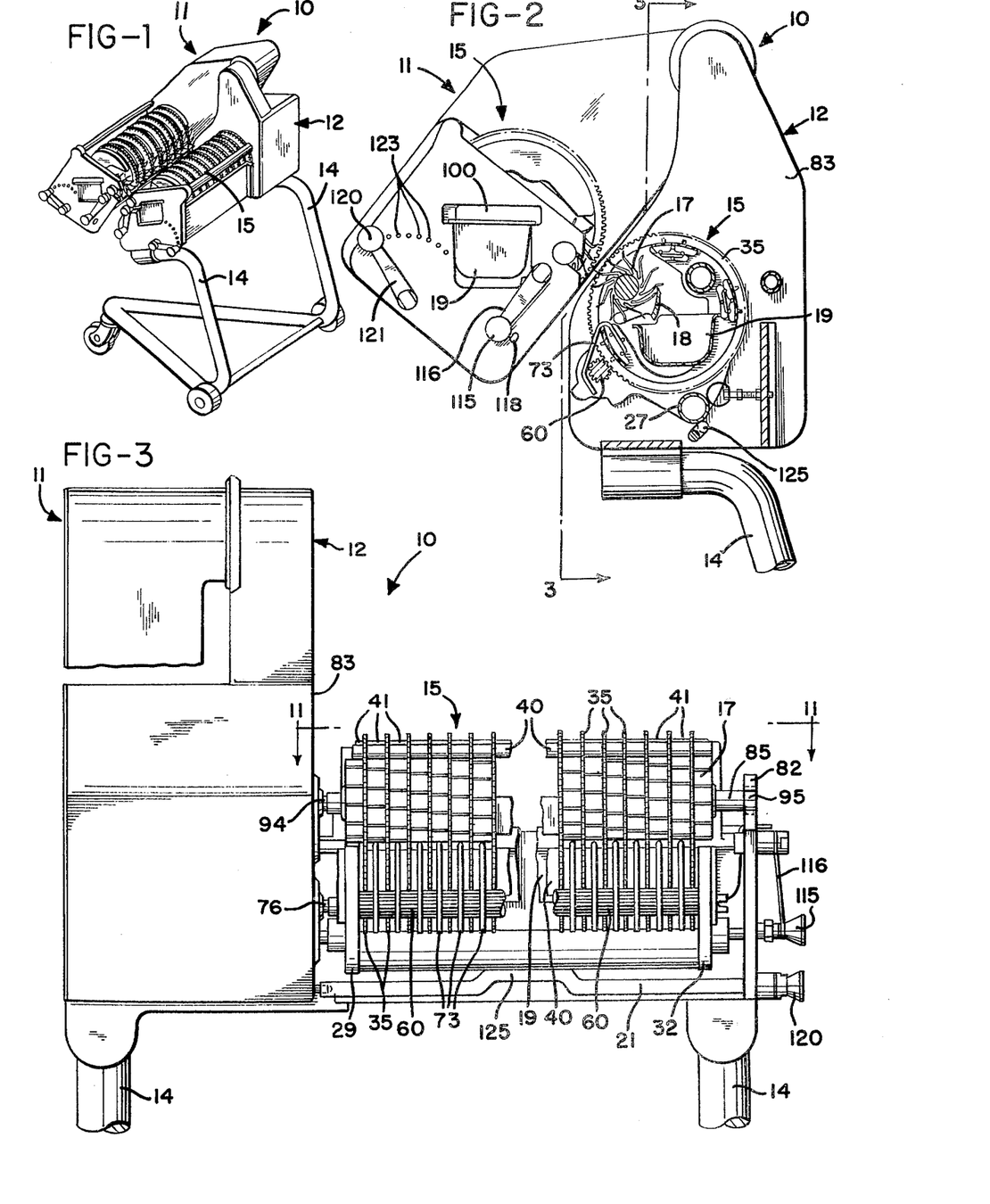
FIG. 1 is a perspective view of a meat scraping machine incorporating the meat gripping and moving cylinder and the cylinder mount of this invention.
FIG. 2 is a partially broken-away view of the meat scraping machine of FIG. 1, showing two facing cylinders mounted within the meat scraping machine.
FIG. 3 is a partially broken-away view of the machine taken on line 3—3 of FIG. 2.

FIG. 1 illustrates the meat scraping machine 10 of this invention, which includes a left hand section 11 pivotally suspended at about a 30° angle from a right hand section 12 that is supported by a stand 14.

Except as will be pointed out, the left and right hand sections 11 and 12 are essentially identical (more or less mirror opposites) so the description will be limited primarily to the right hand section 12, it being understood that the remarks also apply to the left hand section 11.

FIG. 2 shows the relationships of the various components of the meat scraping machine 10. These are shown in greater detail in FIGS. 4–6, and include a meat gripping and moving cylinder and mount subassembly 15, a meat scraper blade assembly 17, a doctor blade 18 for cleaning the blades of the scraper blade assembly 17, a scrap tray 19 for receiving the meat residues from the doctor blade 18, a depth adjustment cam bar 21 for adjusting the amount the blades of the scraper blade assembly 17 penetrate through cylinder 15, and a retaining spring 22 to assist in holding the cylinder assembly 15 within the meat scraping machine 10.

Figures 4, 5, 6:
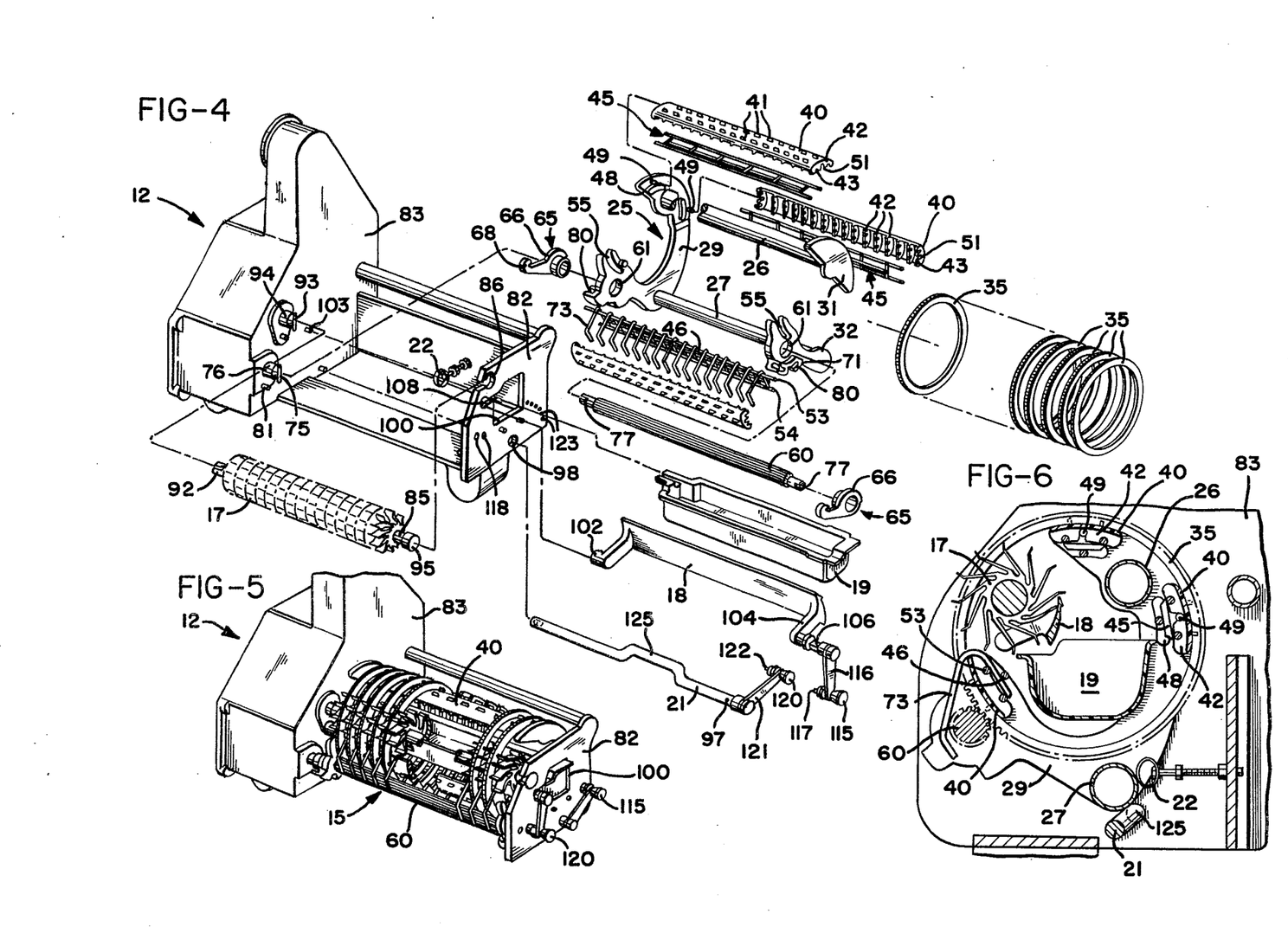
FIG. 4 is an exploded view of the cylinder and machine as shown in FIG. 3.
FIG. 5 is a partially broken-away view of FIG. 4 parts in assembled condition.
FIG. 6 is an enlargement of the cross-sectional view in FIG. 2, showing the interrelationships of the various portions of the machine illustrated in FIGS. 4 and 5.

With reference to FIG. 4, the meat gripping and moving cylinder 15 includes a non-rotating, single piece carrier framework 25 which extends the entire length of the cylinder 15. Framework 25 includes upper and lower transverse bars 26 and 27 which connect a single piece framework end portion 29 to upper and lower framework end portions 31 and 32 at the end of the framework opposite end portion 29. Lower portion 32 and the corresponding part of end portion 29 define a base for the framework 25 so that it may rest in a self-supporting, free-standing position, as suggested in FIG. 7.

A plurality of separate, relatively thin, open, annular, blade-like rings 35 having toothed outer peripheries are supported in spaced-apart coaxial or concentric positions on the framework. (See FIGS. 1, 3 and 5). Rings 35 are rotatable with respect to framework 25, turning on their common axis, and thus define a moving cylinder for engaging and moving a piece of meat through the meat scraping machine 10.

The rings 35 are supported on framework 25 on three plastic ring support members 40. Members 40 include staggered spacer projections 41 alternately disposed along the length of the members 40 (FIG. 11) for guiding the rings 35 thereacross and maintaining the rings in properly spaced-apart relation on the framework.

Figure 7:
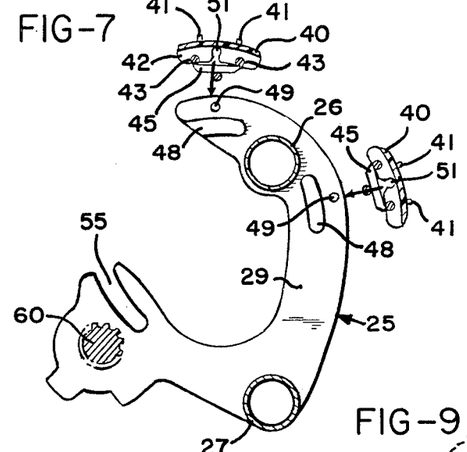
FIG. 7 is a cross-sectional view of the cylinder framework, two ring support and truss assemblies, and the spline gear, illustrating an initial step in the assembly of the cylinder and mount.
Figure 8:
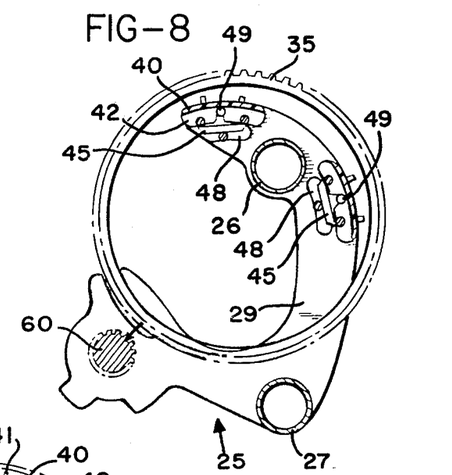
FIG. 8 is a view similar to FIG. 7 illustrating the next assembly step.
Figure 9:
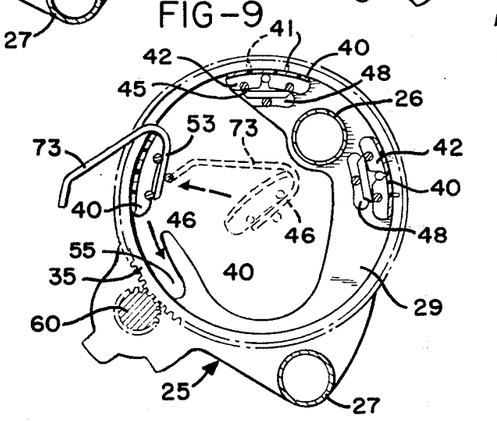
FIG. 9 is a view similar to FIGS. 7 and 8 showing a further assembly step.

For purposes of reinforcement, the undersides of the members 40 have bosses 42 provided with openings 43 for receiving the wires of a reinforcing truss 45 or 46 in snap fitting relation. Two upper truss members 45 support two of the ring support members 40 on the upper portion of framework 25 adjacent upper transverse bar 26 (FIGS. 7-9). The lower truss member 46 receives the remaining ring support member 40 adjacent the lower transverse bar 27.

Figures 12, 13, 14, 15, 17:
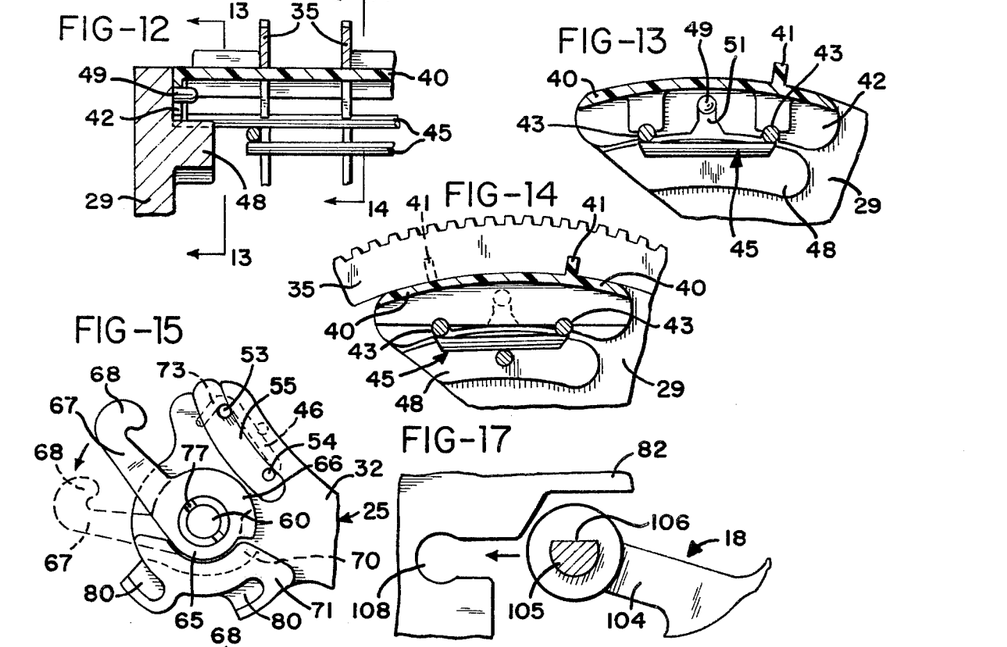
FIG. 12 is an enlarged cross-sectional fragmentary view showing a ring support and truss mounted on one of the shelves of the carrier framework.
FIG. 13 is a cross-sectional view taken on line 13—13 of FIG. 12.
FIG. 14 is a cross-sectional view taken on line 14—14 of FIG. 12.
FIG. 15 is a fragmentary view of the portion of the framework supporting the spline gear, showing the initial steps of assembling and locking the spline gear and adjacent ring support into the carrier framework.
FIG. 17 is a fragmentary cross-sectional view illustrating the insertion of a doctor blade into the meat scraping machine.

The upper truss members 45 are supported on shelves 48 on framework end portions 29 and 31, and the assembled support members 40 and truss members 45 are kept in position on shelves 48 by pins 49 which are received in snap fitting relation in corresponding openings 51 in the end bosses 42 of the support members 40 (see FIGS. 12-14). The ring support members 40 do not actually rest upon shelves 48, but are supported by the truss members 45.

The longitudinal wires 53 and 54 of the lower truss member 46 are received in slots 55 in the framework end portions 29 and 32, to support the lower truss member 46 near the lower framework transverse bar 27 (see FIGS. 7 and 9).

The meat gripping rings 35 are engaged and driven simultaneously by a spline gear 60 supported in framework 25 near the lower transverse bar 27 and just below the lower truss member slots 55. Spline gear 60 is supported in framework holes 61 on spline gear bearing and lock members 65. The spline gear 60 is first inserted into framework 25 through the framework holes 61, and then the bearing members 65 are inserted into the holes 61 around the ends of spline gear 60 to provide bearing supports for the spline gear in framework 25. Each bearing and lock member 65 includes an ear 66 and an arm 67 having a hook 68 on the end.

When the bearing member 65 is first inserted into hole 61 over the end of spline gear 60, the member is disposed as indicated in solid lines in FIG. 15. The member is then rotated in the direction of the arrow to bring arm 67 down within a slot 70 in a mounting boss 71 located adjacent each of the holes 61 in framework end portions 29 and 32. When arm 67 enters slot 70 (dotted line position in FIG. 15) it locks the bearing members 65 in position, thus locking the spline gear into the carrier framework 25.

Following assembly of the spline gear 60 into the framework 25, assembly of the meat gripping and moving cylinder 15 is completed as follows: The ring support members 40 are snapped one each onto the truss members 45 and 46, and the two upper truss members 45 are snapped into position with their support members 40 over pins 49 on the framework end portions 29 and 31 (FIG. 7), bringing the truss members into supporting engagement on shelves 48 (FIG. 13). Next the carrier framework is placed on a surface in its self-supporting or free-standing position (FIGS. 7-9) and the individual meat gripping rings 35 are placed in position on the two truss and support member assemblies 40/45 by passing the rings one at a time through the opening between the framework end portions 31 and 32 (FIG. 4). The rings pass over the support and truss member assemblies 40/45 and between the upper and lower carrier framework transverse bars 26 and 27 (FIG. 8). Each ring is hung on the support members in spaced position between the spacer projections 41 (FIGS. 11-14) until all of the rings have been suspended on the framework.

In order to lock the rings into concentric position on the framework, the third truss and ring support assembly 40/46 is inserted through the opening in the end of the framework between end portions 31 and 32 into the core of the meat gripping ring cylinder. The assembled member 40/46 is then moved from the dotted position shown in FIG. 9 to the solid position by passing the metal finger rods 73 of truss member 46 between each of the meat gripping rings 35 (see FIGS. 3 and 5) until the member 40 engages the inner edges of the rings 35 (FIG. 9). The support member truss assembly 40/46 is then slid in the direction of the solid arrow (FIG. 9) so that the longitudinal wires 53 and 54 thereof enter slots 55 to hold member 40 and truss 46 in position against the meat gripping rings 35, thus locking the rings in concentric position on framework 25.

Figure 16:
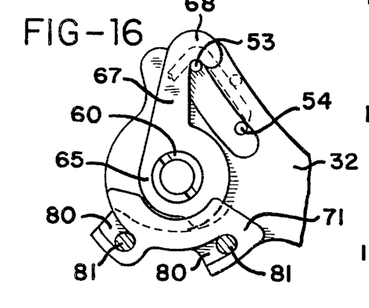
FIG. 16 is a view similar to FIG. 15 showing the hook on the spline gear bearing locked onto the third ring support truss as the final step in assembling the cylinder subassembly for insertion into the meat scraping machine.

Longitudinal wire 53 on truss member 46 is longer than wire 54 (FIG. 4), extending through and beyond the slots 55 in the framework end portions 29 and 32. Truss member 46 may thus be locked in position on framework 25 by moving the bearing and locking member arm 67 (FIGS. 15 and 16) from the dotted position in FIG. 15 to the locked position in FIG. 16, where hook 68 locks into position over the end of the longer truss member wire 53. Note that in this position ear 66 engages within slot 70 to lock the bearing and lock member 65 in position on the carrier framework for affirmative retention of the spline gear 60 and the truss member 46. At this point assembly of the meat gripping and moving cylinder and cylinder mount 15 is complete.

Figure 10:
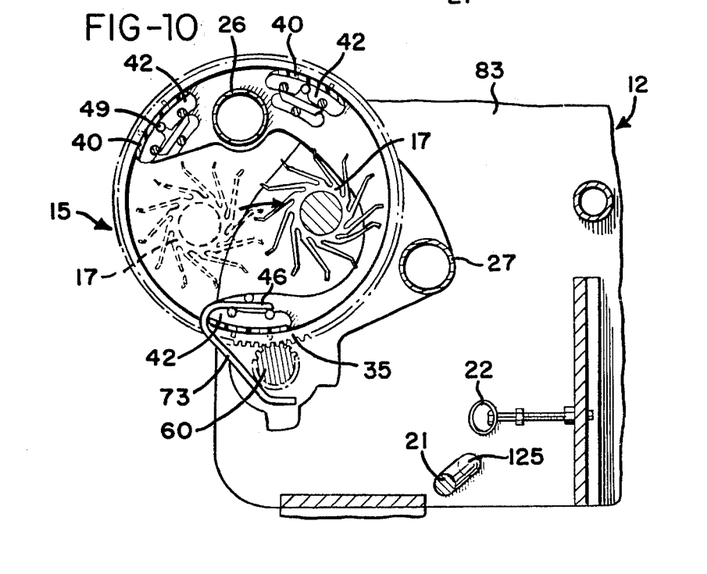
FIG. 10 is a view of the assembled FIG. 9 cylinder illustrating insertion of the cylinder unit into the meat scraping machine.
Figure 11:
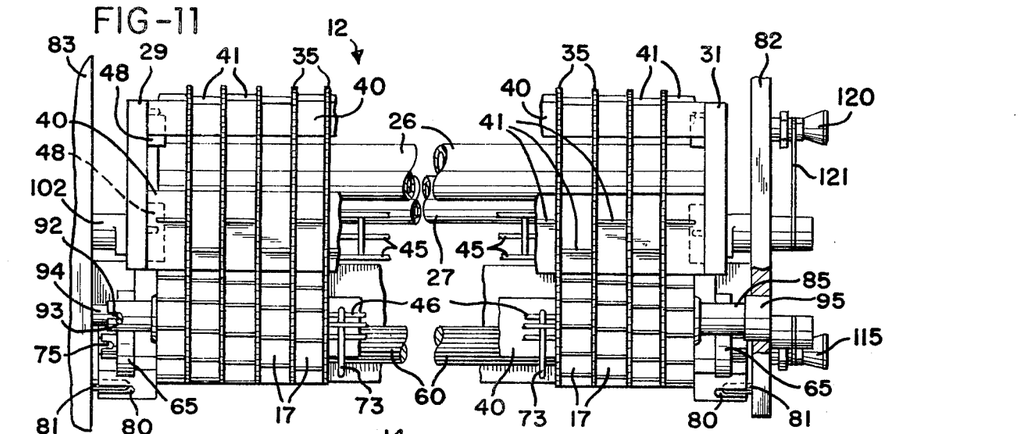
FIG. 11 is a partially broken-away top view of the assembled half of the meat scraping machine shown in FIG. 3, taken on line 11—11 of FIG. 3.

FIG. 10 illustrates an initial step for inserting the meat gripping and moving cylinder assembly 15 into the right hand section 12 of the meat scraping machine 10. The cylinder assembly 15 is positioned approximately as shown in FIG. 10 so that the cross pin 75 on the spline gear drive shaft 76 (FIGS. 4 and 21) enters the cross slot 77 in the hollow end of the spline gear 60. At the same time the two pin channels 80 (FIGS. 4, 11, 15 and 16) in the mounting bosses 71 on framework end portions 29 and 32 are positioned adjacent pins 81 extending from the front and rear walls 82 and 83 of section 12 (FIG. 4). The scraper blade assembly 17 is then inserted into the core of the meat gripping and moving cylinder 13 (dotted position in FIG. 10) and inserted into its operating position in the machine (solid lines in FIG. 10). As described in greater detail in copending U.S. application Ser. No. 566,366, filed Apr. 9, 1975, the scraper blade assembly is inserted into its operating position by passing the narrower neck portion 85 of the scraper blade assembly shaft through a slot 86 (FIG. 4) in the front wall 82 of the right hand section 12 and then engaging the bayonet socket 92 on the opposite end of the scraper blade shaft onto the cross pin 93 of the scraper blade drive shaft 94 (FIGS. 4 and 11). When thus engaged, the enlarged boss 95 on the end of the scraper blade shaft adjacent neck 85 enters the enlarged portion of slot 86 (FIGS. 5 and 11) to support and lock the scraper blade into position in the right hand section 12 of the meat cleaning machine.

After the scraper blade assembly 17 has been inserted, the meat gripping and moving cylinder is rotated clockwise about the spline gear 60 from the position shown in FIG. 10 to the position shown in FIG. 6. Pin channels 80 (FIG. 16) engage pins 81, while the lower transverse bar 27 moves beneath retaining spring 22 (FIG. 6) to hold the meat gripping and moving cylinder assembly 15 against the removable depth adjustment cam bar 21 (FIGS. 4 and 6).

Depth adjustment cam bar 21 is removable for cleaning by rotating the bar until the pin 97 on the cam bar (FIG. 4) clears a slot in the front wall cam bar hole 98 allowing the bar to be removed from the machine through hole 98.

Figure 18:
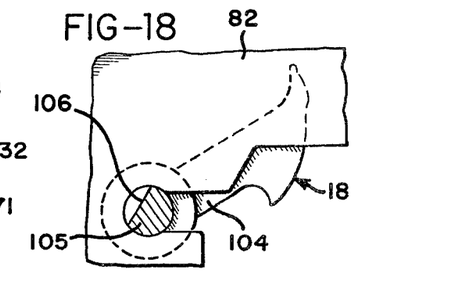
FIG. 18 is a view similar to FIG. 17 illustrating the locking of the doctor blade into the machine.

The doctor blade 18 is next inserted by passing it through the scrap tray opening 100 in front wall 82 and positioning the end 102 onto pin 103 (FIG. 4) on rear wall 83. The end 104 of doctor blade 18 opposite end 102 includes a shaft 105 having a flat 106 (FIGS. 4, 17 and 18) which allows shaft 105 to enter a doctor blade opening 108 in front wall 82. The doctor blade is then rotated counterclockwise as shown in FIGS. 17 and 18 to lock shaft 105 in opening 108, thus locking the doctor blade in the meat scraping machine.

Finally, the scrap tray 19 is inserted through scrap tray opening 100 into the core of the meat gripping and moving assembly 15 and snapped into position beneath doctor blade 18 (FIGS. 4–6), completing assembly of the right hand section 12 of the meat scraping machine 10. As indicated, the left hand section 11 is similarly assembled.

In operation, a cut piece of meat is placed on top of the right hand meat gripping and moving cylinder 15 (FIG. 2). The spline gear 60 in section 12 is rotated in a clockwise direction and, due to its engagement with the teeth on the peripheral surfaces of the meat gripping rings 35, drives the rings in unison in counterclockwise direction. The rings slide easily over the ring support members 40 and are kept in position by spacer projections 41.

The scraper blade assembly 17 is driven in a clockwise direction and the individual scraper blades project between the rings 35 to scrape and clean the faces of the meat as the meat is driven through the machine by the meat gripping rings 35.

The residues which are removed from the meat by the individual blades of the scraper blade assembly 17 are removed from the blades by the doctor blade 18 and allowed to fall into the scrap tray 19 for subsequent removal from machine 10.

The meat gripping rings of the left hand section 11 are driven in clockwise direction while the scraper blade assembly is driven in counterclockwise direction (as viewed in FIGS. 1 and 2) so that both the cut faces of the meat are driven through the machine and are cleaned simultaneously by the cooperating machine sections 11 and 12.

The left hand machine section 11 is suspended for swinging movement from the right hand section. Due to the approximately pivoted 30° elevation of the left hand section it is gravitationally biased toward the right hand section so that the opening between the two sections adjusts automatically according to the thickness of the particular cut of meat being cleaned between the two machine sections.

In order to prevent the meat from binding between the gripping rings 35 and the spline gear 60, and also to pry meat off the rings 35 when it becomes impaled on the ring teeth, each lower truss member 46 supports fingers 73 for projection between the gripping rings 35 to a position over the spline gear 60 (FIGS. 3 and 6).

The meat issuing from the meat scraping machine therefore falls freely and may be collected by any suitable means, such as meat lugs, meat trays, conveyors, and so on.

In order to adjust the position of the doctor blade 18 with respect to the scraper blade 17, shaft 105 of doctor blade 18 has a handle 115 (FIGS. 3–5) connected thereto by means of a strip of spring steel 116. A pin 117 on handle 115 is biased by the spring steel strip 116 into either of two position holes 118 in front wall 82, so that the doctor blade can be moved from a position in engagement with the scraper blade assembly 17 to a position out of engagement. This arrangement is described more particularly in copending application Ser. No. 535,037 filed Dec. 20, 1974, now U.S. Pat. No. 3,954,618.

Figure 19:
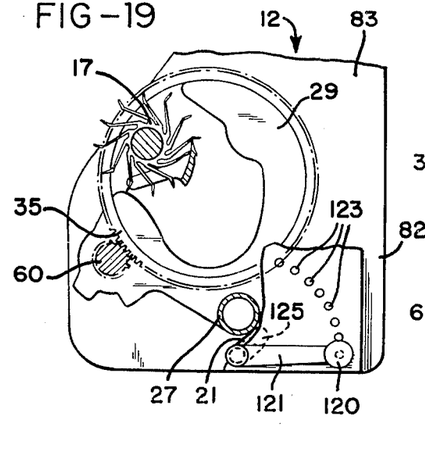
FIGS. 19 and 20 are cross-sectional views similar to FIG. 6 showing the adjustment for controlling the depth of penetration of the scraper blades between and through the rings of the meat gripping and moving cylinder, with portions of the machine omitted for purposes of clarity.
Figure 20:
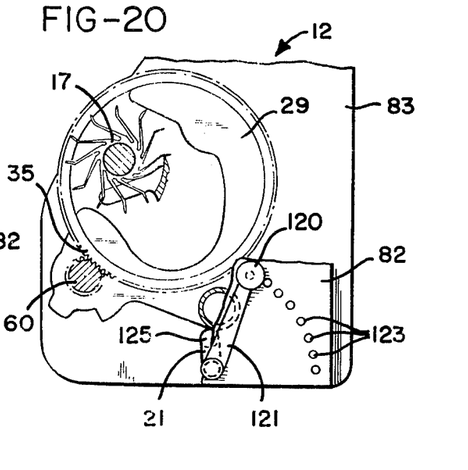

A similar handle 120 (FIGS. 5, 19 and 20) is attached to the end of depth adjustment cam bar 21 by means of a spring steel strip 121. A pin 122 on handle 120 is biased by spring steel strip 121 into one of a series of position holes 123 in the front wall 82. As illustrated in FIGS. 19 and 10, handle 120 is thus able to adjust the amount that the blades of the scraper blade assembly 17 penetrate through and extend beyond cylinder 15. In FIG. 19, pin 122 is engaged in the most clockwise position hole 123 so that the cam bar 21 is moved to its most clockwise position. In this position the camming bump 125 on bar 21 allows the lower carrier framework transverse bar 27 to move downwardly so that the entire meat gripping and moving assembly rotates clockwise about spline gear 60 to increase the penetration of the blades of the scraper blade assembly 17 to a maximum. In FIG. 20, handle 120 is moved to the most counterclockwise position so that the camming bump 125 raises transverse bar 27 to rotate the meat gripping and moving assembly counterclockwise about spline gear 60 for minimum penetration of the blades of the scraper blade assembly. The amount of scraping provided during the cleaning operation may therefore be easily adjusted as required.

In order to extend the life of the spline gears 60 in the left and right hand sections 11 and 12 of the machine, the spline gears are reversible in each carrier framework 25 and are completely interchangeable between the left and right hand carrier framework sections. The spline gears themselves are symmetrical, but are mounted axially eccentrically within each framework section 25, so that their end-for-end positions are asymmetrical with respect to the framework sections.

Figure 21:
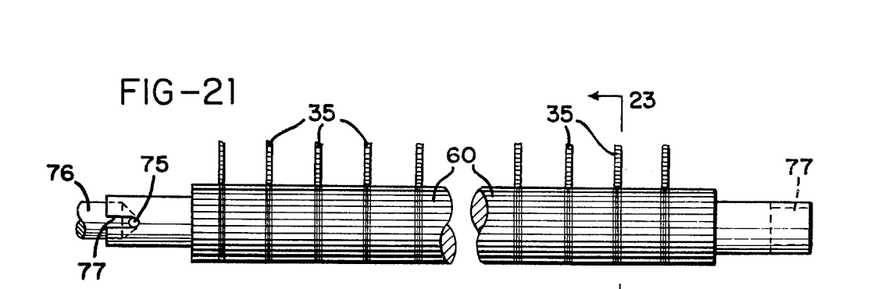
FIG. 21 is a somewhat diagrammatic view showing the axially eccentric position of the spline gear which provides an end-for-end assymetry with respect to the ring gears.
Figure 22:
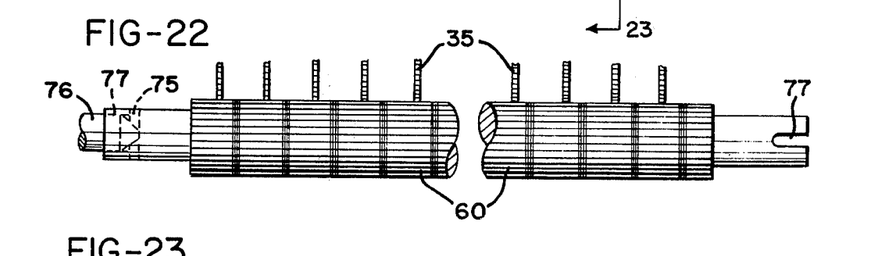
FIG. 22 is a view similar to FIG. 21 with the FIG. 21 spline gear in reversed position, showing the ring gears engaging the spline gear at different locations as a result of the eccentric or end-for-end asymmetrical positioning of the spline gear.

FIG. 21 illustrates such an arrangement where the position of the spline gear 60 is shifted slightly to the right (as illustrated in this Figure) with respect to the positions of the meat gripping rings 35. The regions of wear are therefore shifted to the left along the spline gear, and are illustrated by the vertical lines extending around the spline gear 60 beneath each of the meat gripping rings 35. When the spline gear is then reversed within a particular carrier framework 25, as illustrated in FIG. 22, the wear points between the spline gear and the gripping rings 35 occur at different locations. In FIG. 22, the wear lines from FIG. 21 have been reproduced to show the effect of reversing the spline gear 60 within the same carrier framework.

Figure 23:
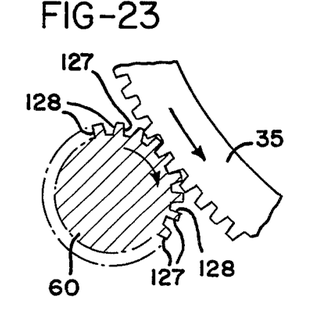
FIG. 23 is a cross-sectional view taken on line 23—23 of FIG. 21 and showing engagement of a spline and ring gear, as in FIG. 6.
Figure 24:
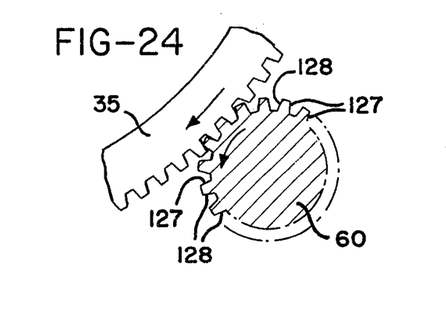
FIG. 24 is a view similar to FIG. 23 showing the same spline gear engaging the ring gears on the meat gripping and moving cylinder in the machine half opposite the cylinder shown in FIG. 6.

FIGS. 23 and 24 illustrate the improved wear characteristics which result from making the spline gears interchangeable between the carrier framework in the left hand machine section 11 and the carrier framework in the right hand machine section 12. FIG. 23 is an enlargement of a fragment of the right hand machine section as shown in FIG. 2, and it can be seen that the clockwise rotation of the spline gear causes the spline gear teeth edges 127 to drive the meat gripping rings 35. FIG. 24 illustrates the corresponding situation when the same spline gear is transferred to the left hand section 11. Here the counterclockwise spline gear teeth edges 128 drive the meat gripping rings 35. Since the wear occurs on the spline gear drive edges 127 in FIG. 23 when the spline gear is in the right hand section 12, and occurs on the opposing counterclockwise edges 128 when in the left hand section 11, the interchangeability of the spline gears 60 between the left and right hand portions of the machine further distributes the wear on the spline gears.

In actual practice, the machine user will reassemble the spline gears into the machine in random fashion, so that the spline gears will occupy each of the four possible positions (two left and two right) in roughly equal proportion, thus increasing the service life of the spline gear by a factor of four.

Stainless steel is the preferred material for the meat gripping rings 35 for reasons of sanitation, and the rings therefore are somewhat expensive. Normally the rings are formed from stainless steel blanks, and the remainder of each blank is simply discarded. For purposes of economy, therefore, the rings in the right hand side of the machine are formed from the same blanks as those of the left side by making the right hand rings of a smaller diameter. A typical embodiment, for example, utilizes 9 inch diameter rings for the left hand section 11 and 8 inch diameter rings for the right hand section 12, each ring being half an inch thick radially. The larger rings are used in the left hand section 11 to provide a greater amount of room in the core thereof since the left hand section is elevated at the 30° angle.

It should be noted that in the description of the machine thus far, not a single tool has been required for the assembly and disassembly steps which have been described. This makes it possible to disassemble the machine for thorough and careful cleaning and to reassemble the machine without using a single tool. Every latching and engaging member is completely hand operable.

Since no tools are needed for assembly, no corresponding screw heads, slots, or other small crevices are required. As may be seen from the Figures (especially FIG. 4), every effort has been made to reduce the exposed cracks, crevices, and screw threads to a minimum. The spacer projections 41, for example, are staggered along the ring support members 40 to facilitate cleaning of the ring support members and to make the spacers relatively crack and crevice free. The ends of spline gear 60 which engage drive shaft 76 include open cross slots 77, and the scraper blade assembly 17 includes an open bayonet socket 92 for ease in cleaning the recesses therein. Similarly, the end of depth adjustment cam bar 21 which fits over pin 97 may be cross slotted to facilitate removal of residues.

As may be seen therefore, this invention has numerous advantages. Maintenance of the meat scraping machine in a clean and sanitary condition is encouraged and facilitated by the ease and speed with which the machine may be disassembled, cleaned and reassembled. Since no tools are needed, cleaning of the machine will never be hindered by the lack or loss of a needed assembling tool. The meat gripping and moving cylinder, including the mount therefor, is separately removable from the machine as an integral unit and may thus be transported easily to any convenient location for disassembly, cleaning, and reassembly. The machine affords not only economy and extended service life, but also provides automatic, rapid, and thorough cleaning of both cut faces of a piece of meat. Further, the machine is able to meet the stringent health and sanitation standards established by the USDA and NSF.

Of course, where it is desired to clean only one side of a piece of meat, one of the left or right hand portions 11 or 12 of the machine may be omitted. Similarly, the meat gripping and moving cylinder and mount 15 of this invention may be incorporated into any other meat scraping machine according to the needs of the particular situation.

While the form of apparatus herein described constitutes a preferred embodiment of this invention, it is to be understood that the invention is not limited to this precise form of apparatus, and that changes may be made therein without departing from the scope of the invention.

What is claimed is:

1. In a meat scraping machine for removing residues of coagulated blood, bone dust, marrow, meat particles, fat, and so on, from a sawed surface of a piece of meat; means for removing such residues; means for operating the residue removing means; and means for bringing the piece of meat into engagement with the residue removing means, including a framework, a plurality of relatively thin, open, annular, blade-like rings, supports for the rings for engaging and holding each of the rings coaxially in position with respect to one another to define a cylinder, the ring supports being mountable in predetermined positions on the framework to lock the rings irremovably on the framework when all the ring supports are mounted in their predetermined positions, and the rings being rotatable with respect to the ring supports when locked thereon; the improvement comprising:
   a. means on the framework for mounting at least one of the ring supports independently on the framework for attachment thereto and removal therefrom independently of any of the rings or the remaining ring supports to provide for removal of said one ring support without removing the rings or the remaining ring supports from the framework, the ring supports again locking the ring irremovably on the framework when said one ring support is remounted in position on the framework, and
   b. the framework also including means forming a part thereof for continuing, when said one ring support has been removed and while the framework remains intact, to support the remaining ring supports in their predetermined positions, and for supporting the rings thereon while releasing the rings and the remaining ring supports and providing for removal thereof from the framework for disassembly and reassembly of the rings and ring supports on the framework while the framework remains intact.

2. The device of claim 1 further comprising:
   a. ring drive means including a spline gear located adjacent said rings for engaging and driving each ring individually to rotate said rings with respect to said framework, and
   b. means removably mounting said ring drive means axially eccentrically and reversibly on said framework so that when said ring drive means is reversed thereon it will engage said rings at axial locations dependent on the axially eccentric position of said ring drive means for distributing wear and extending the service life thereof.

3. A machine according to claim 1 further comprising means forming at least one open-ended slot in the framework at each end of the cylinder for mounting said one ring support thereon, said slots being located near the internal edges of said rings, said one ring support being engageable in said slots by moving it laterally through the open ends of said slots while parallel to said cylinder to move said one ring support into supporting engagement with the rings along the internal edges thereof.

4. The machine of claim 1 wherein the framework further comprises:
   a. first and second end portions located respectively at opposite ends of the cylinder,
   b. a first structural arm connecting said first and second end portions,
   c. a second structural arm connecting said first and second end portions outside the periphery of the rings, and
   d. means forming a portion of said framework end portions for supporting the ring supports individually on the framework on their predetermined positions.

5. For use in a meat scraping machine, a cleanable meat gripping and moving cylinder and mount therefor, comprising:
   a. a non-rotating, single piece framework extending the length of the cylinder,
   b. a plurality of relatively thin, open, annular, blade-like rings,
   c. ring supports on said framework engaging and holding each of said rings coaxially in position on said framework, at least one of said ring supports being removable from said framework,
   d. truss means cooperating with said ring supports to support said ring supports on said framework,
   e. shelf means on said framework for supporting and locating at least one of said support and truss members,
   f. relatively crevice-free spacer projections staggered along said ring supports and located between said rings for maintaining successive said rings in spaced-apart relation on said framework,
   g. said rings being rotatable with respect to said framework and said ring supports,
   h. splined ring drive means for rotating said rings on said framework,
   i. manually operable means removably mounting said ring drive means in a ring engaging and driving position on said framework, said ring drive means being axially eccentrically and reversibly mounted on said framework so that when said ring drive means is reversed thereon it will engage said rings at axial locations dependent on the axially eccentric position of said ring drive means for distributing wear and extending the service life thereof,
   j. means defining slots in said framework adjacent said manually operable ring drive mounting means,
   k. extensions on said removable ring support, said extensions being received in said slot means as said removable ring support is moved to said ring engaging and holding position on said framework, to retain said support in said position,
   l. manually operable lock means adjacent said slot means to engage said extensions to lock said extensions in said slot means in said ring engaging and holding position,
   m. means to support said framework in a self-supporting free-standing position locating one of said ring supports for freely suspending said rings therefrom, for ease of assembly of said cylinder, and
   n. said cylinder, including said framework and said ring supports, being substantially free of exposed threads, cracks, and crevices when disassembled.

6. The device of claim 5 wherein said ring drive means is mounted exteriorily of said rings and further comprising fingers removably mounted between said rings and overlying said ring drive means to guide meat away from said rings.

* * * * *